July 17, 1962     E. J. KINNEY     3,044,196
CULVERT CLEANER

Filed Sept. 14, 1959     2 Sheets-Sheet 1

INVENTOR
E.J. Kinney

BY *A.Yates Dowell*
ATTORNEY

July 17, 1962  E. J. KINNEY  3,044,196
CULVERT CLEANER
Filed Sept. 14, 1959  2 Sheets-Sheet 2
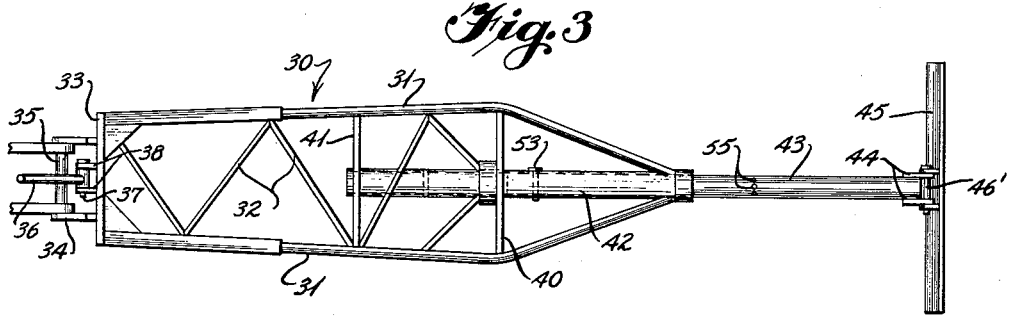
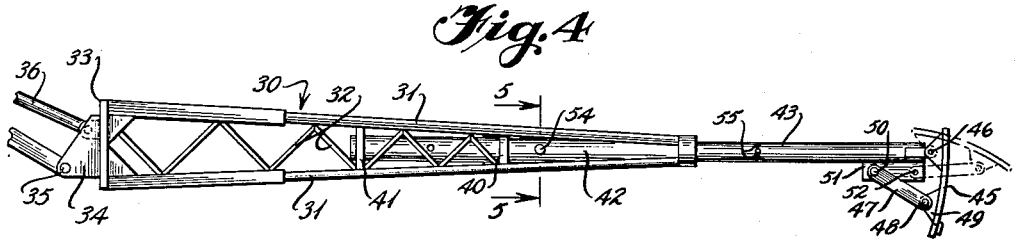
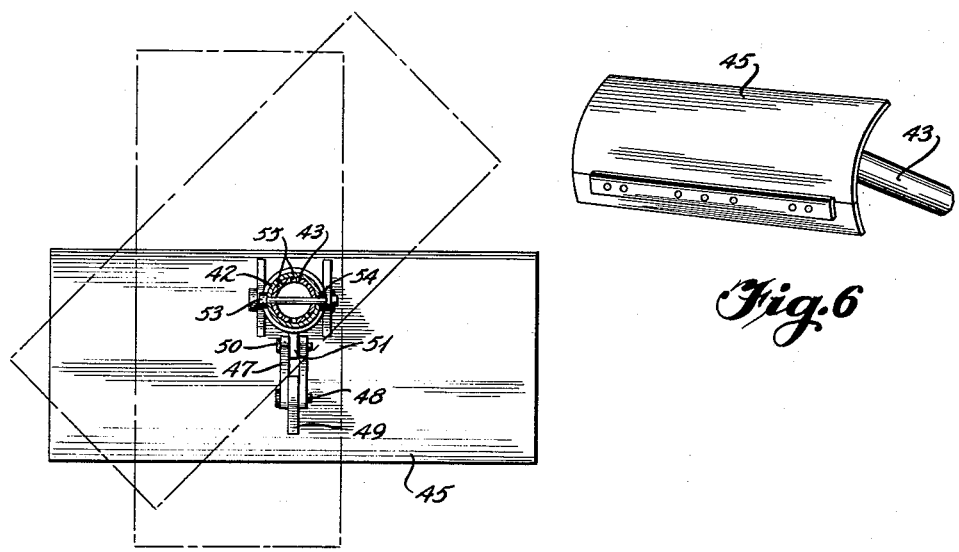
INVENTOR
E.J. Kinney
BY 
ATTORNEY

United States Patent Office 3,044,196
Patented July 17, 1962

3,044,196
CULVERT CLEANER
Edward J. Kinney, P.O. Box 82, Prescott, Ariz.
Filed Sept. 14, 1959, Ser. No. 839,663
5 Claims. (Cl. 37—143)

This invention relates to drainage systems by means of which water including that resulting from heavy precipitation is removed and to the clearing of sand, silt and other foreign matter from such systems in order to allow the free and uninterrupted discharge of surface water.

The invention relates particularly to equipment for cleaning culverts and other drainage areas, which on account of the difficulty of access frequently are neglected, to overcome unsanitary conditions which create hazards to health and property.

It has been customary to clean culverts and other drainage areas manually by workmen who have not been able to stand upright but have had to work on hands and knees in close dark and unsanitary quarters frequented by insects and reptiles and the cleaning of which has been shunned by workmen due to the nature thereof.

It is an object of the invention to provide cleaning equipment for the removal of sand, silt and accumulated debris from culverts and the removal of rocks, growth and deposits from locations difficult of access and which equipment is mechanically operated regardless of whether from a culvert, on the side of a hill, or elsewhere.

Another object of the invention is to provide a machine which can be used for pushing or pulling accumulated matter from culverts or the like and for removing accumulations of earth, rocks or growth from hills, slopes or cuts to eliminate unsanitary conditions as well as hazards to traffic.

Another object of the invention is to provide a device which can be adjusted angularly for pushing, pulling, scraping or otherwise mechanically removing debris and having a blade which can be readily attached to a supporting vehicle and adjusted as to height and angularity for pushing, pulling, scraping or otherwise moving a body of earth or the like and at small cost.

Figure 1:
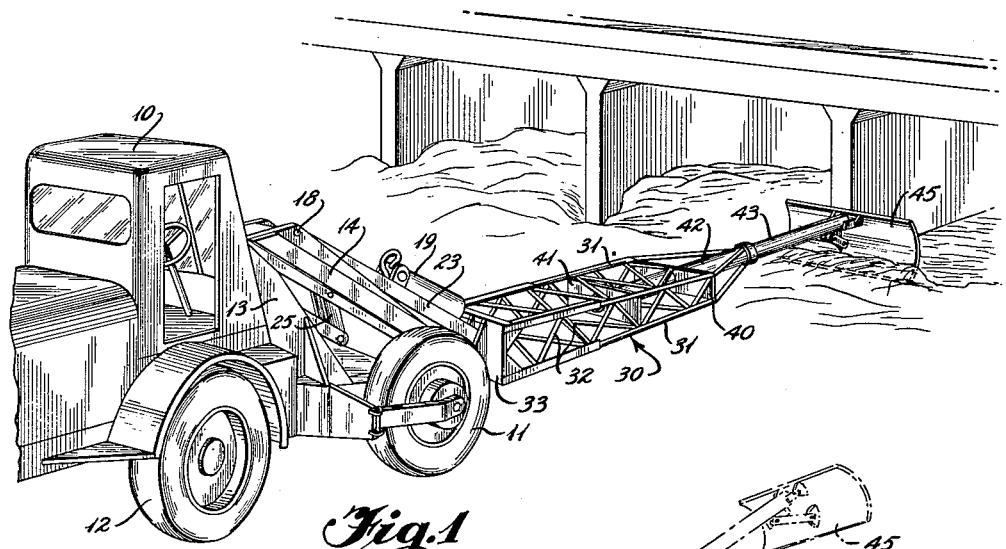

Other objects and advantages of the invention will be apparent from the following description taken in conjunction with the accompanying drawings wherein:

FIG. 1 is a perspective illustrating one application of the invention.

Figure 2:
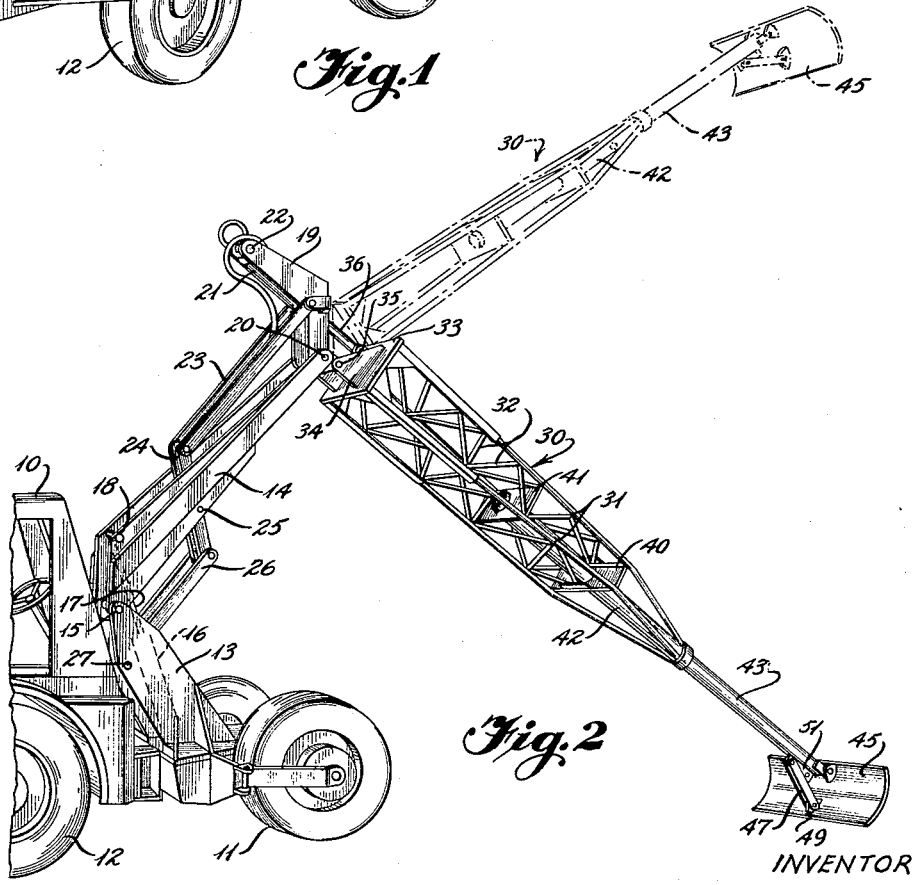

FIG. 2, a similar view with operating mechanism in a different position;

FIG. 3, an enlarged top plan view of the boom of FIG. 1;

FIG. 4, a side elevation of such boom;

FIG. 5, a section on the line 5—5 of FIG. 4; and

FIG. 6, a fragmentary detail perspective of the blade itself.

Briefly stated the present invention comprises an earth working vehicle having a fixed support, a boom pivotally mounted on such support, a second boom pivotally mounted on the free end of the first, the angular disposition of which is controlled by a hydraulic cylinder, a tube being fixed to the second boom in which a rod or pipe forming a post is telescopically received and is adjustable longitudinally and axially thereof and pivotally carrying a pushing or pulling work blade with which culverts or other inaccessible areas can be cleared.

With continued reference to the drawings, an earth working vehicle 10 of any desired character is provided with front and rear pairs of supporting wheels 11 and 12 mounting a fixed support 13.

A boom 14 is mounted by means of a pivot 15 to the top of the support 13 and the movement of the boom is controlled by hydraulic cylinder 16 having a piston 17 mounted in a pivot 18 on the boom 14 in a position remote from the pivot 15.

The outer end of the boom 14 is provided with a pair of brackets 19 connected to the boom 14 by a pivot 20, a hydraulic cylinder 21 being located between the brackets 19 and attached by a pivot 22 to the free end of the brackets 19. The disposition of the brackets 19 and the hydraulic cylinder carried therebetween is controlled by parallel links 23 pivotally connected at one end to the brackets 19 and with the opposite ends pivotally connected to a toggle bar 24 mounted on a pivot 25 on the boom 14. The lower end of the toggle bar is pivotally connected to one end of a lower link 26 the opposite end of which is connected by a pivot 27 to the fixed support 13 in such a manner that the brackets 19 will always remain in substantially fixed relation to the fixed support 13.

A second boom 30 has angular longitudinal side members 31, four of which are shown, joined by braces 32 to form an open framework. The longitudinal side members 31 are connected at their rear ends by a plate 33 having brackets 34 welded or otherwise attached thereto. The boom 30 is connected to the boom 14 by a pivot 35 carried by the brackets 34 and mounted to the underneath portion of the outer end of the boom 14. The raising and lowering of the boom 30 is controlled by a piston 36 operable by the cylinder 21 and connected to the boom 30 by a pivot 37 carried by brackets 38 mounted on the plate 33.

As illustrated in FIGS. 1 and 2 the longitudinal axis of the second boom 30 can be aligned with the longitudinal axis of the boom 14 or the free end of the boom 30 may be positioned above or below the longitudinal axis of the boom 14 in order that the second boom can be located adjacent to the ground and in proximity thereto.

The boom 30 is provided with a pair of cross plates 40 and 41 and the angular side members 31 taper inwardly at their outer ends and are welded or otherwise attached to a cylinder 42 supported by the cross plates 40 and 41. The cylinder 42 is adapted to telescopically receive a second cylinder or tube 43 having a pair of brackets 44 at its outer end to which a concavo-convex work blade 45 is secured by a pivot 46.

The angularity or pitch of the blade 45 is controlled by a link 47 connected by a pivot 48 to a bracket 49 carried by the blade 45 and the opposite end of the link 47 is connected by a pivot 50 to a plate 51 depending from the outer end of the cylinder 43. The plate 51 may have two or more holes 52 which receive the pivot 50 for changing the angular adjustment of the blade 45.

The cylinder 43 is longitudinally and rotatably adjustable within the cylinder 42 by means of a pin 53 mounted in openings 54 in the cylinder 42. The cylinder 43 is provided with a series of openings 55 of a size to receive the pin 53 and maintain the blade in fixed angular or tilt adjustment and a plurality of such series of holes are located along the longitudinal length of the cylinder 43 so that such cylinder may be projected and retracted within the cylinder 42 to align a series of holes with the pin 53 and the openings 54.

In the operation of the device the cylinder 43 is telescopically positioned relative to the cylinder 42 and fixed angularly by aligning the openings 54 and 55 and inserting the pin 53 to hold the cylinders in fixed adjusted tilt position. The pitch of the blade 45 is fixed by positioning the link 47 in one of the holes 52 in the plate 51. The machine is then moved into position near the work as for example in front of a culvert and the boom 30 is raised sufficiently for the blade 45 to clear the debris in the culvert. The vehicle is then moved forwardly and the boom dropped by the hydraulic cylinder 19 until the blade engages the debris at which time the movement of the vehicle is reversed and moved rearwardly to pull the debris from the culvert where it can be disposed of in any conventional manner. If desired the angle of the blade 45 may be reversed to form a pushing surface rather than a pulling surface and the vehicle may then be used to push debris from the opposite end of the culvert.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The combination of an earth working vehicle having a support attached thereto, a boom pivoted on said support, a bracket pivotally mounted on the free end of said boom, means connected to said fixed support for maintaining said bracket in substantially fixed relation to said support, a second boom pivoted on the free end of the first boom, means for independently swinging said booms to align the longitudinally axis of the first boom with the longitudinal axis of the second boom or to locate the free end of the second boom above or below the longitudinal axis of the first boom whereby said second boom can be located parallel with and in proximity to the earth.

2. The structure of claim 1 having a tube carried lengthwise by the second boom and extending beyond the end of the same, a post telescopically carried by said tube, means for fixing said post in adjusted tilt and telescoped positions, a work blade pivoted transversely of the outer end of said post, and means whereby the pitch of said work blade can be adjusted.

3. The combination of an earth working vehicle having a support attached thereto, a boom pivoted on said support, a bracket pivotally mounted on the free end of said boom, means connected to said support for maintaining said bracket in substantially fixed relation thereto, a second boom pivoted on the free end of the first boom, means for independently swinging said booms to align the longitudinal axis of the first boom with the longitudinal axis of the second boom or to locate the free end of the second boom above or below the longitudinal axis of the first boom, a tube mounted axially of said second boom, a post telescopically carried by said tube, and a work blade mounted on the outer end of said post whereby said second boom can be located parallel with and in proximity to the earth and said work blade can be adjusted toward and from the vehicle.

4. The structure of claim 3 including means pivotally connecting said work blade to the outer end of said post and means whereby the pitch of said work blade can be adjusted.

5. The structure of claim 3 including means for tilting said post and means for fixing said post in adjusted tilted position.

References Cited in the file of this patent

UNITED STATES PATENTS

| 1,712,853 | Taylor | May 14, 1929 |
| 1,977,287 | Olson | Oct. 16, 1934 |
| 2,334,323 | Gilbert | Nov. 16, 1943 |
| 2,370,830 | Arps | Mar. 6, 1945 |
| 2,383,686 | Ryan | Aug. 28, 1945 |
| 2,493,565 | Arps | Jan. 3, 1950 |
| 2,731,283 | Weischel | Jan. 17, 1956 |
| 2,755,939 | Rush | July 24, 1956 |
| 2,822,628 | Arps | Feb. 11, 1958 |
| 2,949,199 | Jones | Aug. 16, 1960 |

FOREIGN PATENTS

| 152,711 | Sweden | Dec. 13, 1955 |